US012779867B2

(12) United States Patent
Suda

(10) Patent No.: US 12,779,867 B2
(45) Date of Patent: Nov. 3, 2026

(54) LIQUID DISCHARGE APPARATUS

(71) Applicant: CANON KABUSHIKI KAISHA, Tokyo (JP)

(72) Inventor: Koji Suda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 213 days.

(21) Appl. No.: 18/903,952

(22) Filed: Oct. 1, 2024

(65) Prior Publication Data

US 2025/0115052 A1 Apr. 10, 2025

(30) Foreign Application Priority Data

Oct. 4, 2023 (JP) ................................ 2023-173262

(51) Int. Cl.
*B41J 2/175* (2006.01)
*B41J 2/165* (2006.01)

(52) U.S. Cl.
CPC ....... *B41J 2/17566* (2013.01); *B41J 2/16505* (2013.01); *B41J 2/17509* (2013.01); *B41J 2/17553* (2013.01); *B41J 2002/17569* (2013.01)

(58) Field of Classification Search
CPC ............... B41J 2/17566; B41J 2/17509; B41J 2/17553; B41J 2002/17569; B41J 2002/17579; B41J 29/13; B41J 29/38
See application file for complete search history.

(56) References Cited

U.S. PATENT DOCUMENTS

| | | | | |
|---|---|---|---|---|
| 12,441,121 | B2 * | 10/2025 | Genda | B41J 2/17566 |
| 2015/0336381 | A1 * | 11/2015 | Kyoso | B41J 2/0451 347/14 |
| 2016/0279963 | A1 * | 9/2016 | Koganehira | B41J 29/13 |

FOREIGN PATENT DOCUMENTS

| | | | |
|---|---|---|---|
| JP | 2000190531 | A | 7/2000 |
| JP | 2002154216 | A | 5/2002 |
| JP | 2002273906 | A | 9/2002 |
| JP | 3577011 | B2 | 10/2004 |
| JP | 2006150802 | A | 6/2006 |
| JP | 2008074106 | A | 4/2008 |
| JP | 2017035846 | A | 2/2017 |

* cited by examiner

*Primary Examiner* — Kristal Feggins
(74) *Attorney, Agent, or Firm* — Canon U.S.A., Inc. IP Division

(57) ABSTRACT

A liquid discharge apparatus includes an estimation unit that estimates, as an estimated usage amount, an amount of a liquid discharged by a recording head during a certain period. The estimation unit calculates a first correction value for correcting the estimated usage amount based on a first difference that is a difference between a first amount and a second amount, the estimated usage amount, and a second difference between the first difference and the estimated usage amount. Thereafter, the estimated usage amount is corrected based on the correction value. In a case where the second difference is greater than a threshold value, the estimation unit does not calculate the first correction value.

5 Claims, 15 Drawing Sheets

LIQUID DISCHARGE APPARATUS

BACKGROUND

Field

The present disclosure relates to a liquid discharge apparatus.

Description of the Related Art

It is conventionally known that some of liquid discharge apparatuses that discharges a liquid from a liquid discharge head onto a recording medium to perform recording, detect the amount of the liquid in a liquid storage unit that stores the liquid. Japanese Patent No. 3577011 discusses a configuration in which the remaining ink level is calculated or corrected according to the determination by a sensor 11 on the presence or absence of ink in an ink tank 5.

However, in Japanese Patent No. 3577011, ink counters C1 and C2 that acquire and accumulate the number of ink dots consumed by the recording head at each scan are used to calculate and correct the remaining ink level. Since there may be variation in the amount of ink discharged from the recording head, an error may occur between the estimated remaining ink amount and the actual remaining ink amount.

SUMMARY

The present disclosure is directed to improving the accuracy of detecting the amount of a liquid in a liquid storage unit.

According to an aspect of the present disclosure, a liquid discharge apparatus includes a liquid discharge head configured to discharge a liquid, a liquid storage unit configured to store the liquid to be supplied to the liquid discharge head, a first detection unit configured to detect whether an amount of the liquid stored in the liquid storage unit is equal to or greater than a first amount or is less than the first amount, a second detection unit configured to detect whether the amount of the liquid stored in the liquid storage unit is equal to or greater than a second amount or is less than the second amount, the second amount being smaller than the first amount, and an estimation unit configured to estimate, as an estimated usage amount, an amount of the liquid discharged by the recording head during a period between a time when the first detection unit detects that the amount of the liquid stored in the liquid storage unit has changed from a state of being equal to or greater than the first amount to a state of being less than the first amount and a time when the second detection unit detects that the amount of the liquid stored in the liquid storage unit has changed from a state of being equal to or greater than the second amount to a state of being less than the second amount, wherein the estimation unit calculates a first correction value for correcting the estimated usage amount based on a first difference that is a difference between the first amount and the second amount, the estimated usage amount, and a second difference that is a difference between the first difference and the estimated usage amount, and then corrects the estimated usage amount based on the first correction value, and wherein in a case where the second difference is greater than a threshold value, the estimation unit does not calculate the first correction value.

Further features of the present disclosure will become apparent from the following description of exemplary embodiments with reference to the attached drawings.

DESCRIPTION OF THE EMBODIMENTS

An example of an exemplary embodiment of a recording apparatus and a liquid storage tank will be described in detail below with reference to the accompanying drawings. The following exemplary embodiment does not limit the present disclosure, and not all of the combinations of features described in the present exemplary embodiment are necessarily essential to the solution of the present disclosure. Furthermore, the positions, shapes, and the like of the components described in the exemplary embodiment are mere examples, and are not intended to limit the scope of the present disclosure to these examples.

Figure 1:
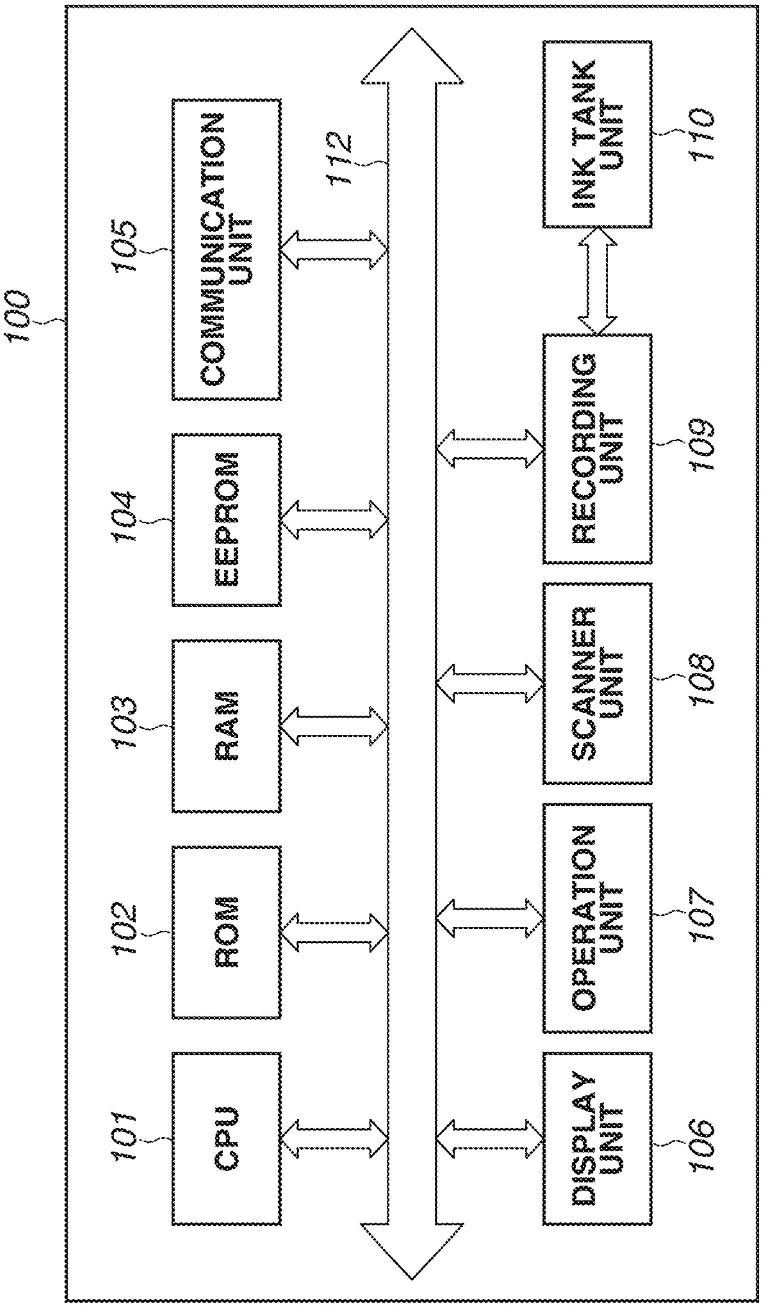
FIG. 1 is a block diagram illustrating a hardware configuration of a recording apparatus.
Figure 7:
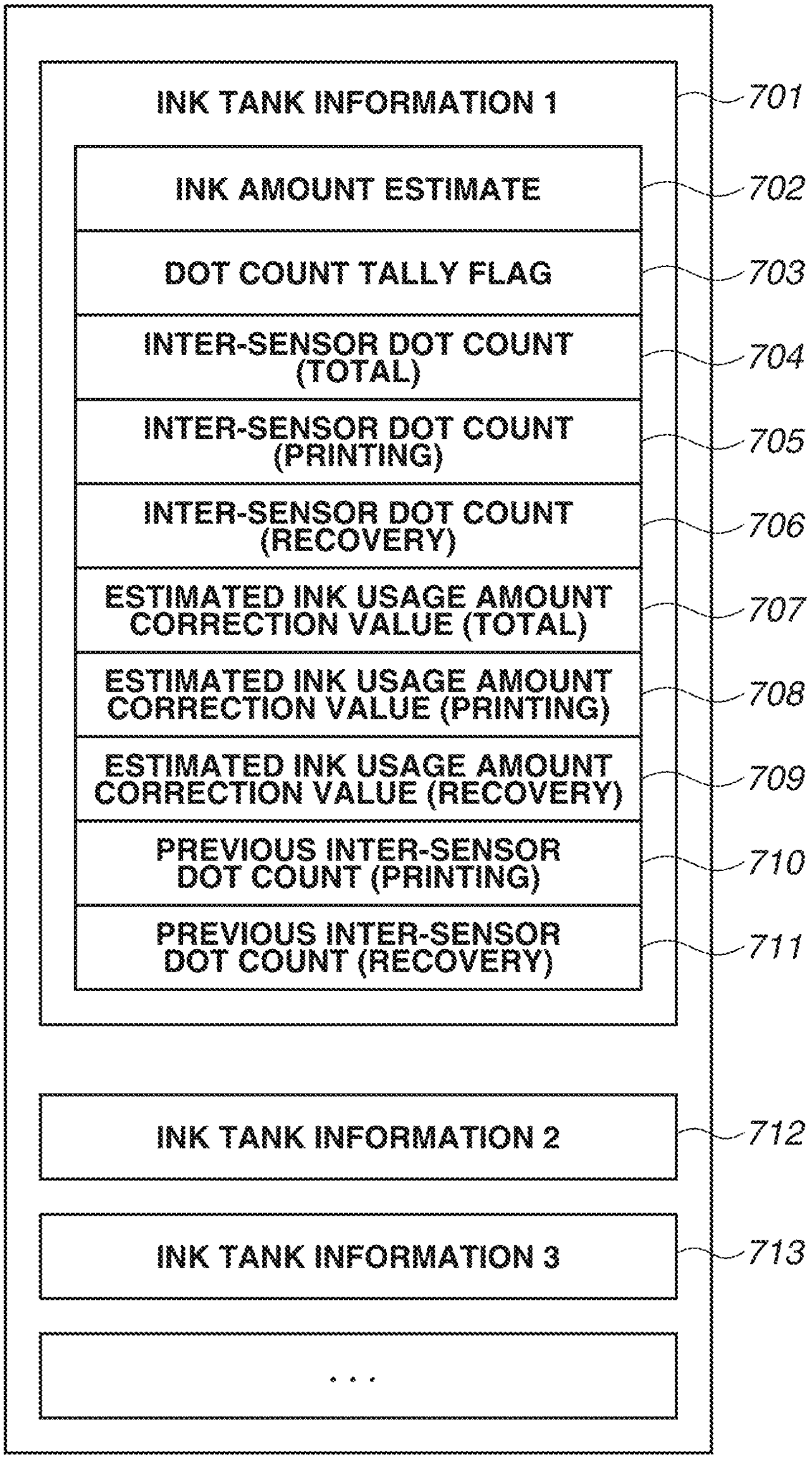
FIG. 7 is a diagram illustrating non-volatile information relating to the ink tank unit stored in the recording apparatus.

FIG. 1 is a block diagram illustrating an example of a hardware configuration of an inkjet recording apparatus 100 (hereinafter, recording apparatus 100) as a liquid discharge apparatus. The recording apparatus 100 has a central processing unit (CPU) 101, a read only memory (ROM) 102, a random access memory (RAM) 103, and an electrically erasable programmable read only memory (EEPROM) 104. The CPU 101 is a central processing unit for controlling each part in the recording apparatus 100. The ROM 102 stores various program codes. The RAM 103 temporarily stores image data and the like and performs buffering at execution of each service. The EEPROM 104 stores non-volatile information. The non-volatile information includes shipping destination information of the recording apparatus 100, settings of the language to be displayed on a display unit 106, and the like. In the exemplary embodiment of the present disclosure, ink tank information illustrated in FIG. 7 is stored in particular. Details will be described below with reference to FIG. 7.

The recording apparatus 100 has a communication unit 105. The communication unit 105 is connected to an external device such as a host personal computer (PC) via a universal serial bus (USB) or a network. That is, the communication unit 105 is connected to a USB or a network and communicates with an external device. The RAM 103 also stores image data and the like received by the communication unit 105.

The display unit 106 is constituted of a liquid crystal display or the like, for example, and can display characters, figures, indicators, and the like. The display unit 106 is not limited to a liquid crystal display, and can also be constituted of a light emitting device (LED) or another display. Examples of information displayed on the display unit 106 includes setting information for the recording apparatus 100, and information related to the ink contained in an ink tank unit 110. The information related to the ink includes information about the remaining amount of ink contained in the ink tank, color information, and the like, for example. Driving of the display unit 106 is controlled by the CPU 101.

An operation unit 107 is made up of switches, hard keys, and the like for allowing the user to perform various input operations. The display unit 106 may function as the operation unit 107, as in a touch panel.

The recording apparatus 100 has a scanner unit 108, a recording unit 109, and the ink tank unit 110. The ink tank unit 110 is a liquid storage unit that stores ink to be supplied to a recording head 401 (see FIG. 4) included in the recording unit 109. The ink tank unit 110 is provided for each color, and each ink tank unit 110 and the recording head 401 are connected via a supply tube 411 (see FIG. 4). The ink supplied by the supply tube 411 is discharged from the recording head 401 to a recording medium. The recording unit 109 includes a carriage 402 (see FIG. 4) that moves while carrying the recording head 401. In recording on a recording medium, the recording head 401 discharges ink while being moved by the carriage 402 to form an image on the recording medium. The recording on the recording medium by the recording unit 109 is performed based on image data received by the communication unit 105, image data read by the scanner unit 108, or the like.

The scanner unit 108 optically reads an original placed on a platen 201 (see FIG. 2) and converts the read data into electronic data, and then converts the electronic data into image data in a specified file format. The converted image data is transmitted to an external device via the communication unit 105, or stored in a storage area such as a hard disk device (HDD). The recording apparatus 100 also has a copy function with which to read an original placed on the platen 201 with the scanner unit 108, transfer the generated image data to the recording unit 109, and record an image on a recording medium by the recording unit 109 based on the image data.

The above-described units are connected to each other via a bus 112, and are capable of transmitting and receiving data to and from each other. The recording apparatus 100 does not necessarily have to include a scanner unit.

Figure 2:
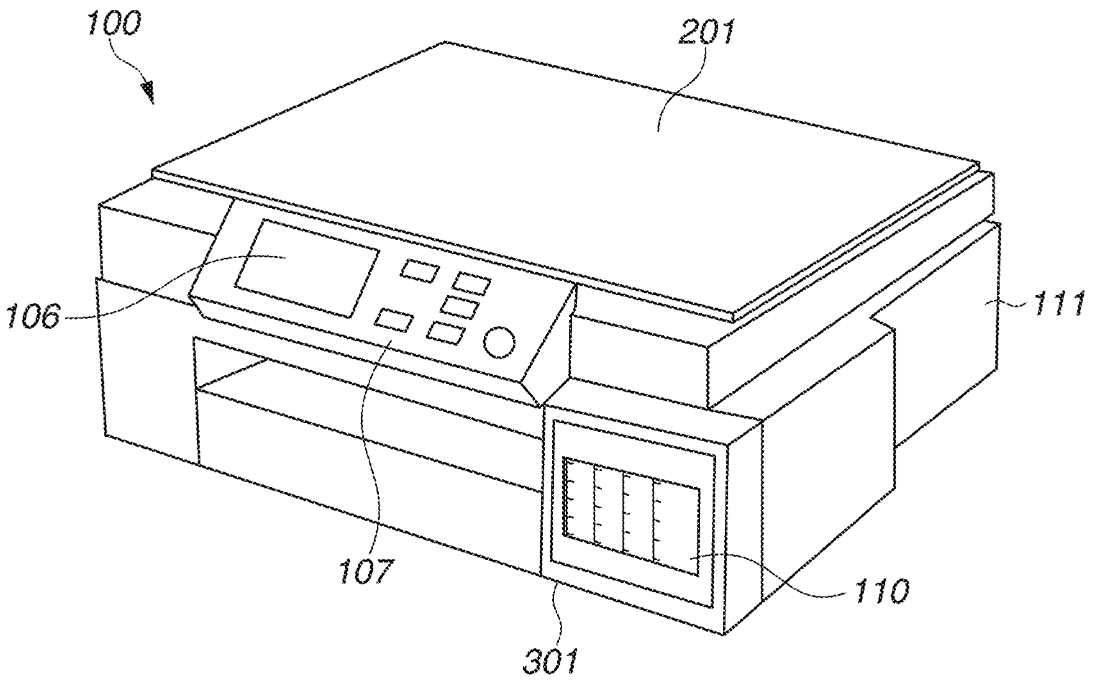
FIG. 2 is a perspective view of the recording apparatus.
Figure 3A:
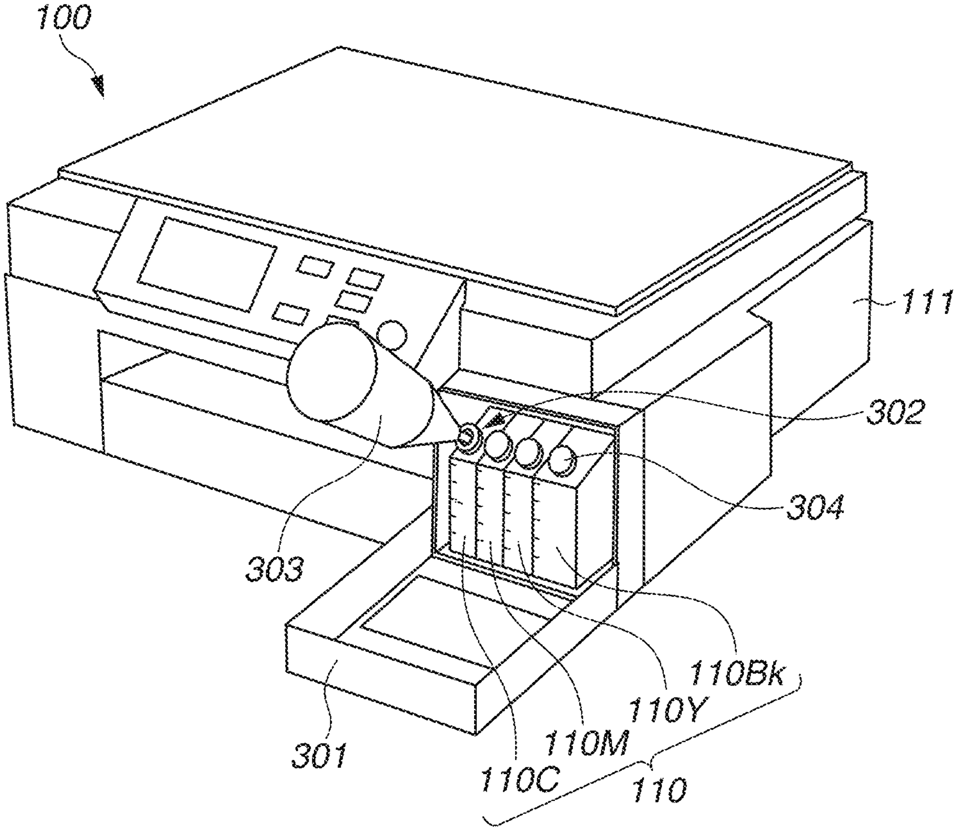
FIGS. 3A and 3B are schematic diagrams illustrating an ink injection state of the recording apparatus and ink bottles.
Figure 3B:
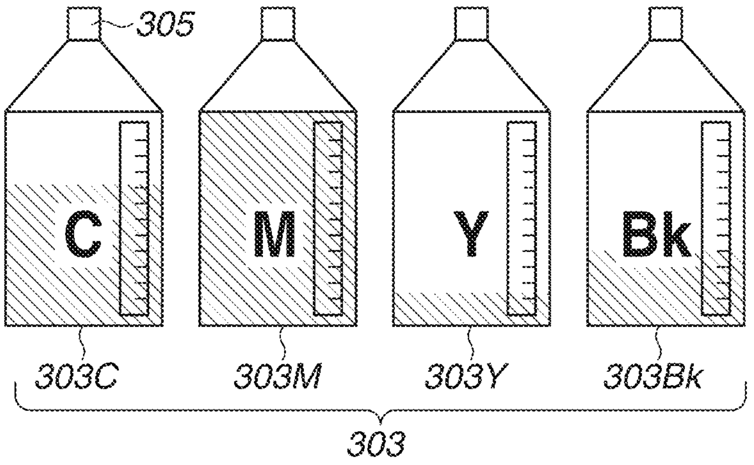

FIG. 2 is a perspective diagram schematically describing the recording apparatus 100, and FIGS. 3A and 3B are schematic diagrams illustrating the ink injection state of the recording apparatus 100 and ink bottles. The recording apparatus 100 in the present exemplary embodiment has a box-shaped housing 111 in which the recording unit 109 and the ink tank unit 110 are arranged. The display unit 106 and the operation unit 107 are provided on the front of the recording apparatus 100, and a platen glass 201 is provided on the top of the recording apparatus 100.

In the recording apparatus 100 of the present exemplary embodiment, the user can refill the ink tank unit 110 with ink. The ink tank unit 110 has an ink injection port 302, which is closed by a cap 304 except when ink is being injected into the ink tank unit 110. When an ink tank cover 301 provided on the housing 111 is closed (the state illustrated in FIG. 2), the ink injection port 302 and the cap 304 are covered by the ink tank cover 301.

At the time of refilling ink, the user opens the ink tank cover 301 to expose the ink tank unit 110, and accesses the cap 304 and the ink injection port 302. The user removes the cap 304 of the ink tank unit 110 to be refilled from the ink injection port 302 to open the ink injection port 302, connects an injection portion 305 of the ink bottle 303 to the ink injection port 302, and injects the ink into the ink tank unit 110.

The recording apparatus 100 can discharge a plurality of different types of color ink and record a color image on a recording medium. In the present exemplary embodiment, the recording apparatus 100 has ink tanks 110C, 110M, 110Y, and 110Bk, which respectively store ink of four colors, cyan (C), magenta (M), yellow (Y), and black (Bk).

The ink bottle 303 for injecting ink into the ink tank unit 110 is also prepared for each color. Ink bottles 303C, 303M, 303Y, and 303Bk contain ink of cyan (C), magenta (M), yellow (Y), and black (Bk), respectively, and each include an injection portion 305. In the present exemplary embodiment, the ink tank units 110C, 110M, 110Y, and 110Bk are all identical in configuration, and the ink bottles 303C, 303M, 303Y, and 303Bk are also all identical in configuration. Hereinafter, a configuration of one ink tank unit 110 will be described as a representative.

Figure 4:
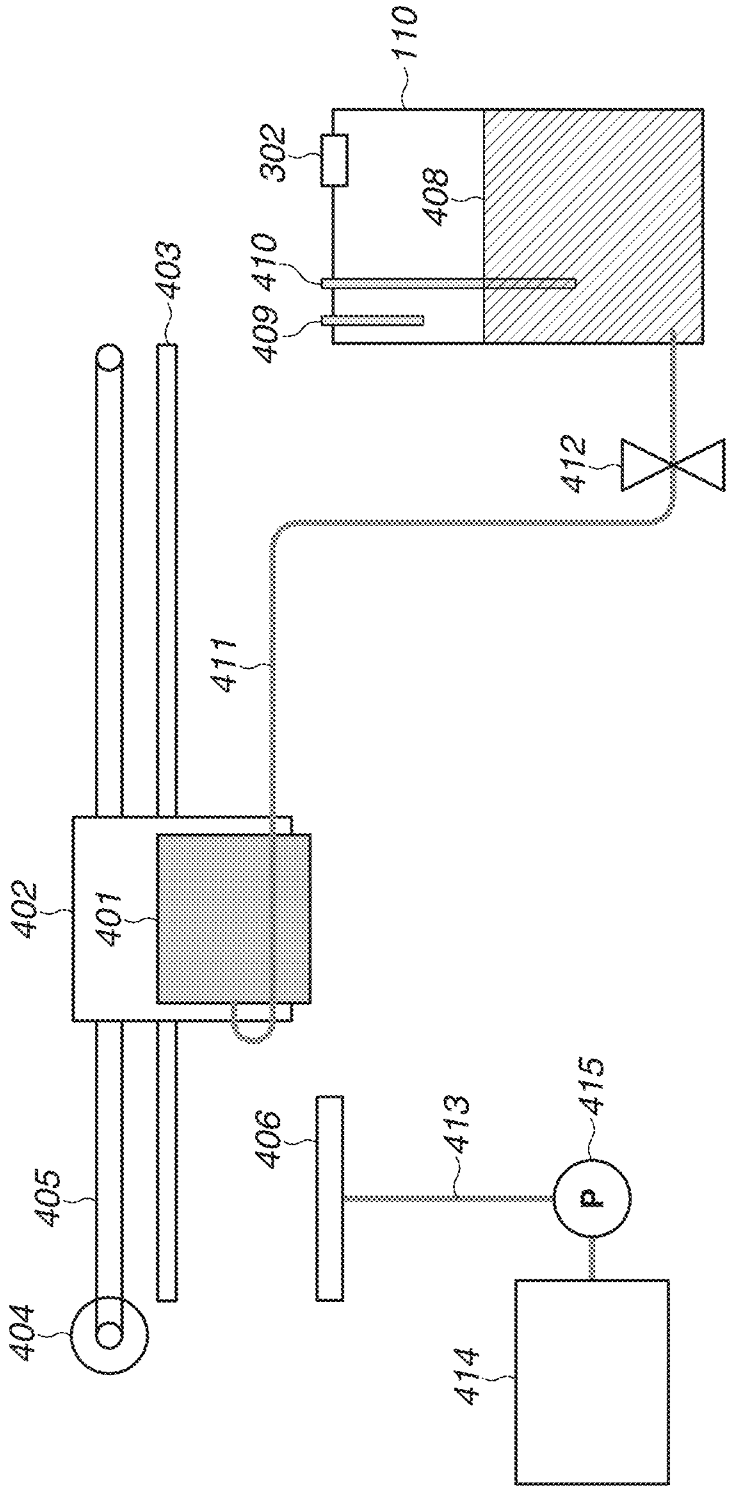
FIG. 4 is a diagram illustrating a schematic configuration of a recording head and an ink tank unit of the recording apparatus.

FIG. 4 is a diagram illustrating a schematic configuration of the recording head and ink tank unit. The recording head 401 is mounted on the carriage 402 that is supported by a guide shaft 403 and a belt 405. When driven by a carriage motor 404, the belt 405 rotates to move the carriage 402 connected thereto in the right-left direction in the drawing.

The lower surface of the recording head 401 is a discharge surface in which a discharge port for discharging ink is formed. When the recording apparatus 100 does not perform recording, a cap unit 406 is in close contact with the discharge surface to suppress the discharge port from drying out. The cap unit 406 also has a recovery function as a recovery means for maintaining and recovering the discharge performance of the recording head 401 by discharging ink from the discharge port of the recording head 401 and suctioning ink by driving a suction pump 415. In order to maintain the discharge performance, the recording head 401 periodically performs preliminary discharge by discharging ink to the cap unit 406. Waste ink discharged into the cap unit 406 is then discharged to a waste ink absorber 414 via a discharge tube 413, and the waste ink is held by the waste ink absorber 414.

The ink tank unit 110 stores ink 408 and includes the ink detection sensors 409 and 410. Each of the ink detection sensors 409 and 410 is constituted of a pair of electrodes, and obtains a voltage or the like which is a potential difference between the time of voltage application to the electrodes and the end of the voltage application, and compares this electrical information with a threshold value which serves as a reference value to determine whether there is any ink remaining in the ink tank 110.

The ink tank unit 110 and the recording head 401 are connected by the supply tube 411. A choke valve 412 is provided in the middle of the supply tube 411. In supplying the ink 408 to the recording head 401, the cap unit 406 is brought into close contact with the discharge port surface of the recording head 401, and suction is performed by the suction pump 415 with the choke valve 412 closed. This makes it possible to perform suction with an increased internal pressure in the supply tube 411 and to remove unwanted bubbles and foreign matter from the supply tube 411 by the powerful suction.

Figure 5:
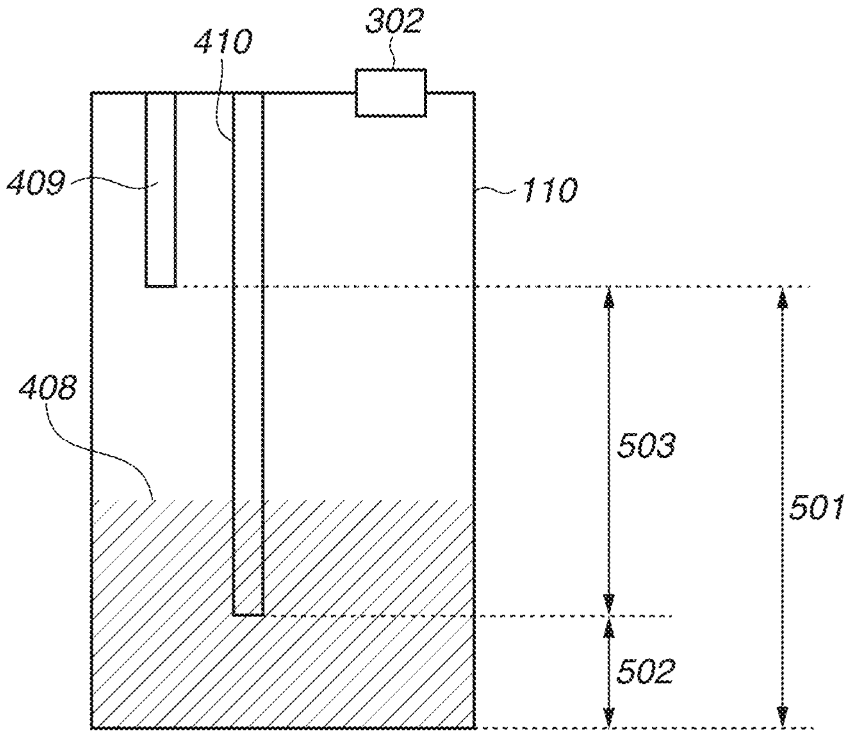
FIG. 5 is a detailed diagram of an internal configuration of the ink tank unit.

FIG. 5 is a detailed diagram of an internal configuration of the ink tank unit 110. In the present exemplary embodiment, the ink detection sensors 409 and 410 are provided with a difference in the position of the lower end so that it is possible to make a difference in the amount of remaining ink that can be detected by the ink detection sensors 409 and 410. Remaining ink amount 501 is the lower limit of the amount of remaining ink that can be detected by the upper ink detection sensor 409, and remaining ink amount 502 is the lower limit of the amount of remaining ink that can be detected by the lower ink detection sensor 410. Ink amount 503 is the difference between the remaining ink amount 501 and the remaining ink amount 502. The ink amount 503 is determined by the physical attachment positions of the ink detection sensors 409 and 410.

Figure 6A:
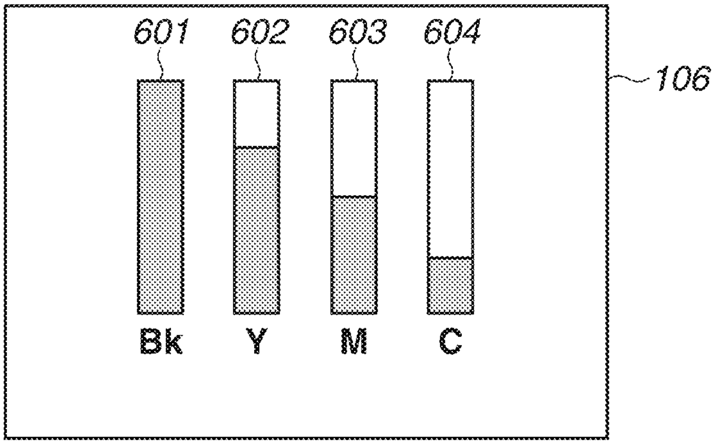
FIGS. 6A and 6B illustrate details of ink amount indications for the ink tank unit displayed on a display unit.
Figure 6B:
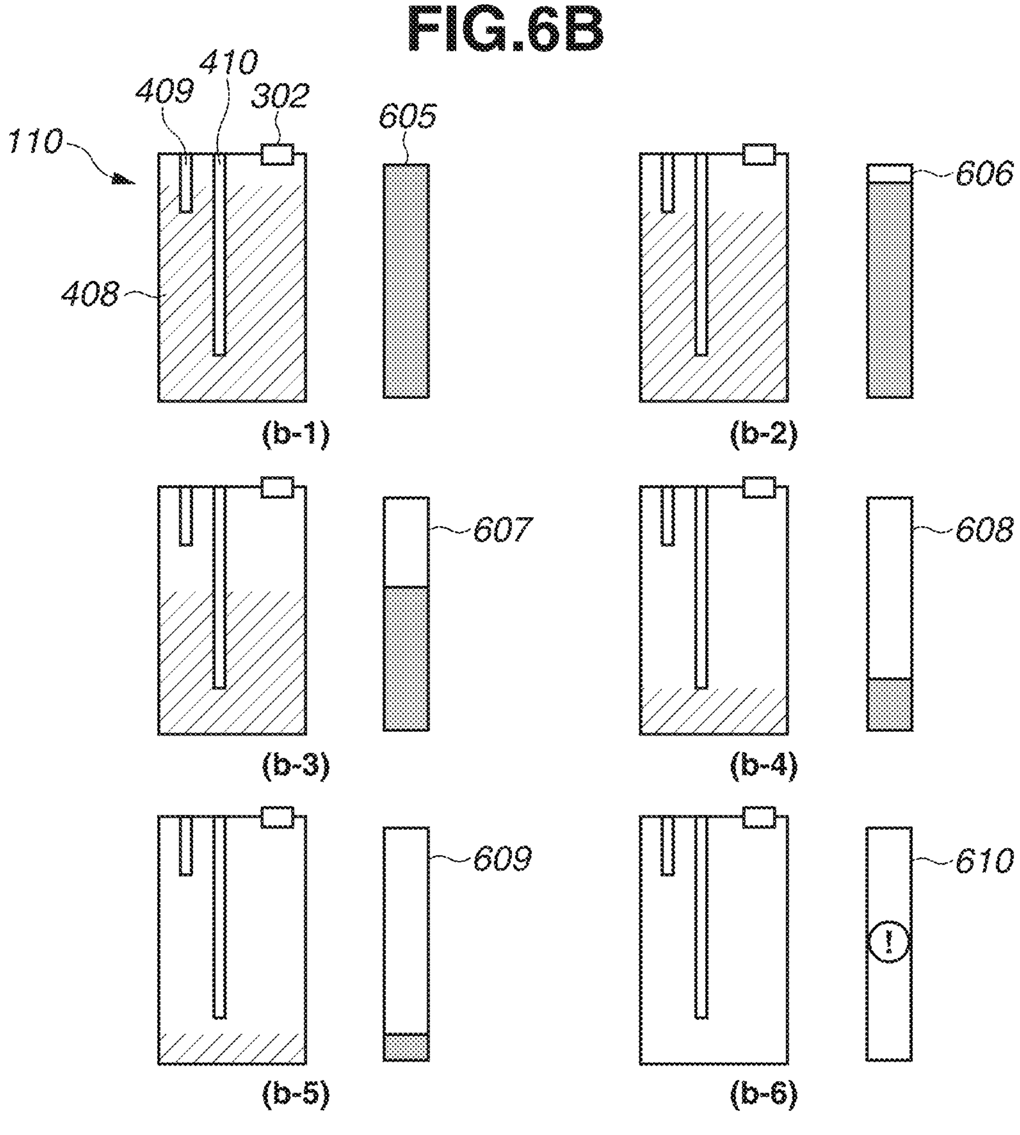

FIGS. 6A and 6B illustrate details of ink amount indications related to the ink tank unit 110 displayed on the display unit 106. As illustrated in FIG. 6A, the display unit 106 displays ink amounts 601 to 604 of all colors of cyan (C), magenta (M), yellow (Y), and black (Bk).

The relationship between the ink amount indications and detection by the ink detection sensors 409 and 410 will be described. When the ink detection sensor 409 detects ink, a remaining ink amount 605 is displayed as illustrated in FIG. 6B-1. When the ink detection sensor 409 no longer detects ink, a remaining ink amount 606 is displayed as illustrated in FIG. 6B-2. While the ink detection sensor 409 detects the absence of ink and the ink detection sensor 410 detects the presence of ink, a remaining ink amount 607 is displayed as illustrated in FIG. 6B-3, which is estimated based on the amount of ink discharged from the recording head 401. When the ink detection sensor 410 detects the absence of ink, a remaining ink amount 608 is displayed as illustrated in FIG. 6B-4.

When the ink detection sensor 410 detects the absence of ink, a remaining ink amount 609 is displayed as illustrated in FIG. 6B-5, which is estimated based on the amount of ink discharged from the recording head 401. When the lack of ink in the ink tank unit 110 is estimated, a remaining ink amount 610 is displayed as illustrated in FIG. 6B-6.

FIG. 7 illustrates non-volatile information related to the ink tank unit 110 stored in the recording apparatus 100. The non-volatile information related to the ink tank unit 110 is stored in the EEPROM 104. Ink tank information 1 701 holds information related to the remaining amount of ink in each ink tank. The ink tank information is present for individual ink tanks, that is, the ink tank information 1 701, ink tank information 2 712, and ink tank information 3 713.

Each ink tank information includes an ink amount estimate 702, a dot count tally flag 703, an inter-sensor dot count (total) 704, an inter-sensor dot count (printing) 705, an inter-sensor dot count (recovery) 706, an estimated ink usage amount correction value (total) 707, an estimated ink usage amount correction value (printing) 708, an estimated ink usage amount correction value (recovery) 709, a previous inter-sensor dot count (printing) 710, and a previous inter-sensor dot count (recovery) 711.

The ink amount estimate 702 holds information related to an estimate of the amount of ink present in the ink tank unit 110. A method for estimating the remaining ink amount will be described below with reference to FIG. 8. The dot count tally flag 703 holds information on whether to measure the number of times ink is discharged from the recording head 401 (dot count). Details of the dot count tally process will be described below with reference to FIG. 9.

The inter-sensor dot count (total) 704, the inter-sensor dot count (printing) 705, and the inter-sensor dot count (recovery) 706 hold information on the dot count value from the recording head 401 by each use application for which the recording head 401 discharged ink. In the present exemplary embodiment, the information is held in three categories: the dot count in the printing process (recording), the dot count in the recovery process, and the total dot count in both the printing process and the recovery process. Details of the inter-sensor dot count tally process will be described below with reference to FIG. 9.

The estimated ink usage amount correction value (total) 707, the estimated ink usage amount correction value (printing) 708, and the estimated ink usage amount correction value (recovery) 709 hold information related to correction values that are used at the time of ink usage amount estimation. In the present exemplary embodiment, the estimated ink usage amount correction values are held in three categories: the ink usage amount in the printing process, the ink usage amount in the recovery process, and the total ink usage amount in both the printing process and the recovery process. Details of a method for creating the estimated ink usage amount correction process and a method for estimated ink usage amount correction will be described below with reference to FIGS. 10, 13, and 14.

Figure 8:
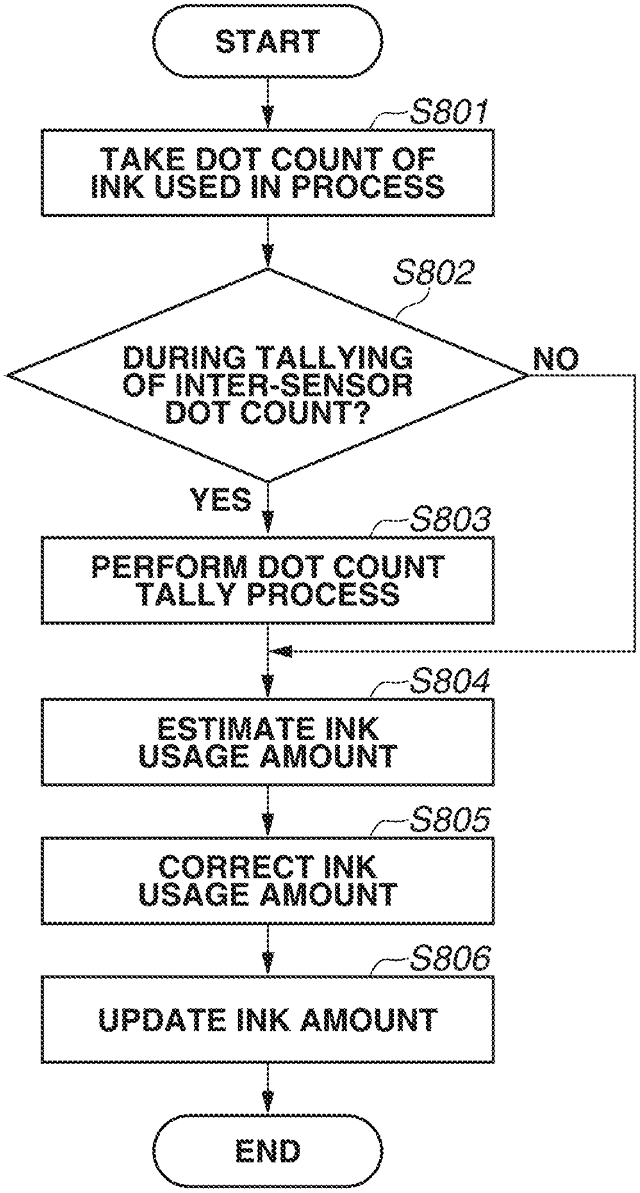
FIG. 8 is a flowchart of a process executed when ink is used in the recording apparatus.

FIG. 8 is a flowchart of a series of process steps executed when ink is used in the recording apparatus 100. The process in FIG. 8 is executed by the CPU 101 reading a program from the ROM 102 into the RAM 103 and executing the program at a timing when any of various types of ink-used processes is completed, such as when a printing process is ended or when a recovery process is ended.

In step S801, the dot count value of ink for which a discharge command has been issued to the recording head 401 during an ink-used process is measured. In step S802, a dot count tally flag is acquired from non-volatile information, and it is determined whether a dot count needs to be tallied. If it is determined that tallying is necessary (YES in step S802), the process proceeds to step S803, and if it is determined that tallying is not necessary (NO in step S802), the process proceeds to step S804. Details of switching the tally flag will be described below with reference to FIGS. 11 and 12.

In step S803, the ink dot count value measured in step S801 is saved as non-volatile information. Details of the dot count saving process will be described below with reference to FIG. 9. In step S804, an estimated ink usage amount in the ink-used process is calculated based on the ink dot count value measured in step S801 and the mass per dot of ink. In step S805, a correction process is performed on the estimated ink usage amount calculated in step S804. Details of the estimated ink usage amount correction process will be described below with reference to FIG. 10. In step S806, the ink amount estimate 702 is updated by subtracting the estimated ink usage amount corrected in step S805 from the ink amount estimate 702 saved as the non-volatile information. In addition, the remaining ink amount displayed on the display unit 106 of the recording apparatus 100 is updated based on the updated ink amount estimate 702.

Figure 9:
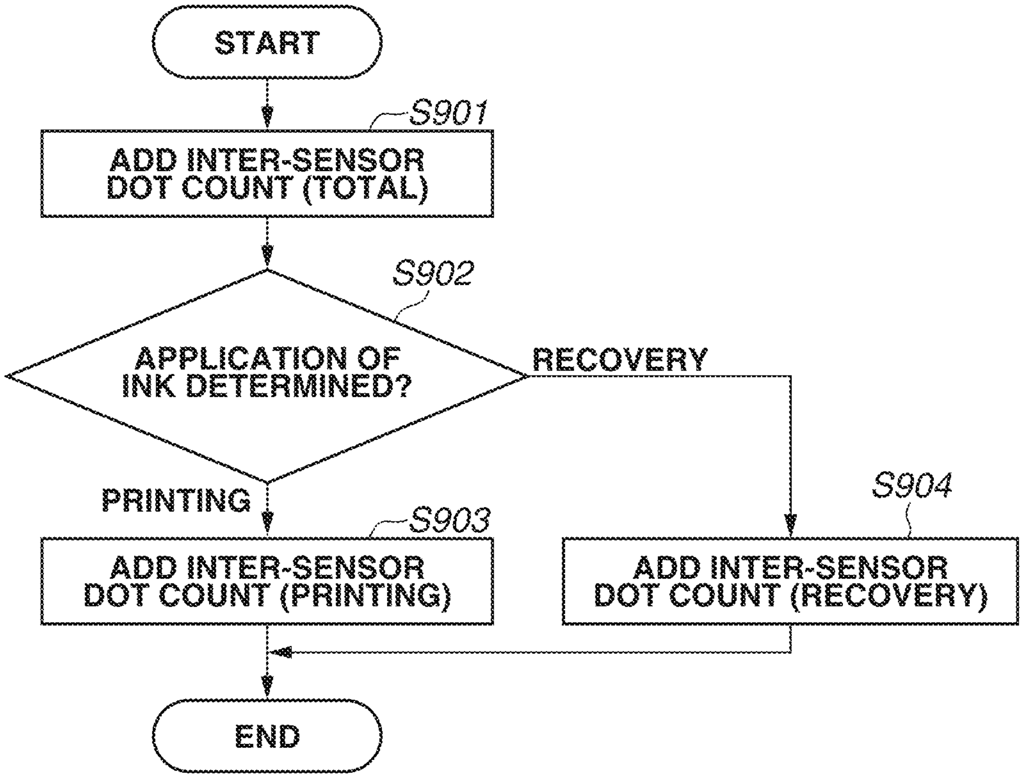
FIG. 9 is a flowchart of a process for saving an ink dot count in the non-volatile information.

FIG. 9 is a flowchart of a series of process steps for saving the ink dot count in non-volatile information. This process is executed by the CPU 101 reading a program from the ROM

102 into the RAM 103 and executing the program when it is determined that dot count tallying is necessary at the timing when ink is used in the recording apparatus 100 (YES in step S802 in FIG. 8).

In step S901, the inter-sensor dot count (total) 704 obtained from the non-volatile information is updated by adding the dot count value measured in the dot count measurement process to the inter-sensor dot count (total) 704. In step S902, the use application of the ink is determined. If the use application of the ink is a printing process (printing in step S902), the process proceeds to step S903, and if the use application of the ink is a recovery process (recovery in step S902), the process proceeds to step S904.

In step S903, the inter-sensor dot count (printing) 705 acquired from the non-volatile information is updated by adding the dot count value measured in the dot count measurement process to the inter-sensor dot count (printing) 705. In step S904, the inter-sensor dot count (recovery) 706 acquired from the non-volatile information is updated by adding the dot count value measured in the dot count measurement process to the inter-sensor dot count (recovery) 706.

Figure 10:
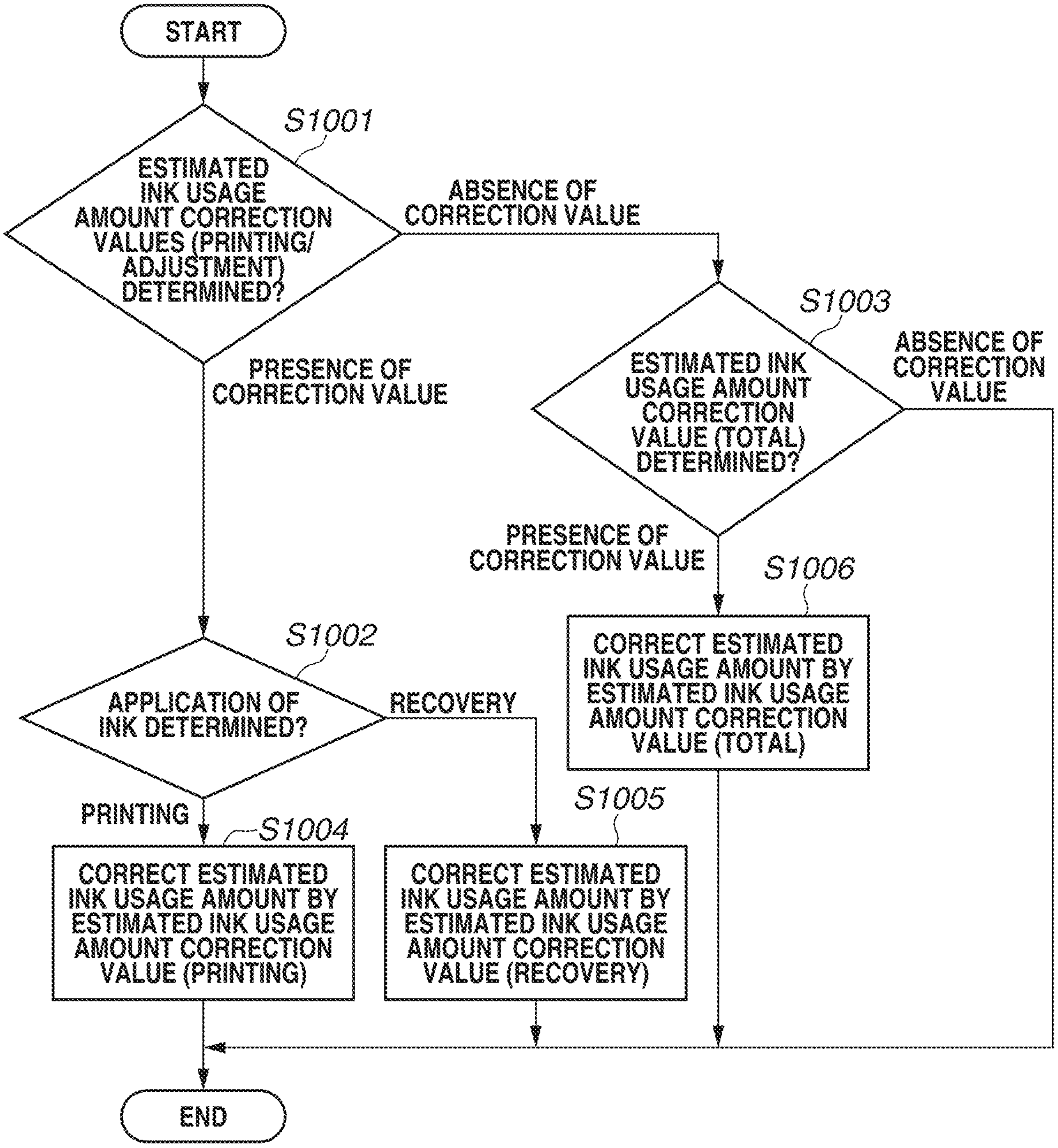
FIG. 10 is a flowchart of a process for correcting an estimated ink usage amount.

FIG. 10 is a flowchart of a series of process steps for correcting the estimated ink usage amount. For example, this process is implemented by the CPU 101 illustrated in FIG. 1 reading a program from the ROM 102 into the RAM 103 and executing the same. This process is carried out after the process of estimating the ink usage amount in the recording apparatus 100 (step S804 in FIG. 8).

In step S1001, it is determined whether correction values are saved in the estimated ink usage amount correction value (printing) 708 and the estimated ink usage amount correction value (recovery) 709 of the non-volatile information 701. If correction values are saved in the estimated ink usage amount correction value (printing) 708 and the estimated ink usage amount correction value (recovery) 709 (presence of correction values in step S1001), the process proceeds to step S1002. If correction values are not saved in the estimated ink usage amount correction value (printing) 708 and the estimated ink usage amount correction value (recovery) 709 (absence of correction values in step S1001), the process proceeds to step S1003.

In step S1002, the use application of the ink is determined. If the use application of the ink is a printing process (printing in step S1002), the process proceeds to step S1004, and if the use application of the ink is a recovery process (recovery in step S1002), the process proceeds to step S1005.

In step S1004, the estimated ink usage amount is corrected by applying the estimated ink usage amount correction value (printing) 708 to the estimated ink usage amount (estimated usage amount) estimated in the ink usage amount estimation process. Specifically, the estimated ink usage amount is corrected by multiplying the estimated ink usage amount by the estimated ink usage amount correction value (printing) 708. For example, if the estimated ink usage amount is 10 ml and the estimated ink usage amount correction value (printing) is 0.9, the estimated ink usage amount is corrected to 9 ml.

In step S1005, the estimated ink usage amount is corrected by applying the estimated ink usage amount correction value (recovery) 709 to the estimated ink usage amount estimated in the ink usage amount estimation process. Specifically, the estimated ink usage amount is corrected by multiplying the estimated ink usage amount by the estimated ink usage amount correction value (recovery) 709. For example, if the estimated ink usage amount is 10 ml and the estimated ink usage amount correction value (printing) is 0.8, the estimated ink usage amount is corrected to 8 ml.

In step S1003, it is determined whether a correction value is saved in the estimated ink usage amount correction value (total) 707 in the non-volatile information 701. If a correction value is saved in the estimated ink usage amount correction value (total) 707 (presence of correction value in step S1003), the process proceeds to step S1006. If a correction value is not saved in the estimated ink usage amount correction value (total) 707 (absence of correction value in step S1003), the process ends without execution of the correction process.

In step S1005, the estimated ink usage amount estimated in the ink usage amount estimation process is corrected by applying the estimated ink usage amount correction value (total) 707 to the estimated ink usage amount. Specifically, the estimated ink usage amount is corrected by multiplying the estimated ink usage amount by the estimated ink usage amount correction value (total) 707. For example, if the estimated ink usage amount is 20 ml and the estimated ink usage amount correction value (total) is 0.85, the estimated ink usage amount is corrected to 17 ml.

Figure 11:
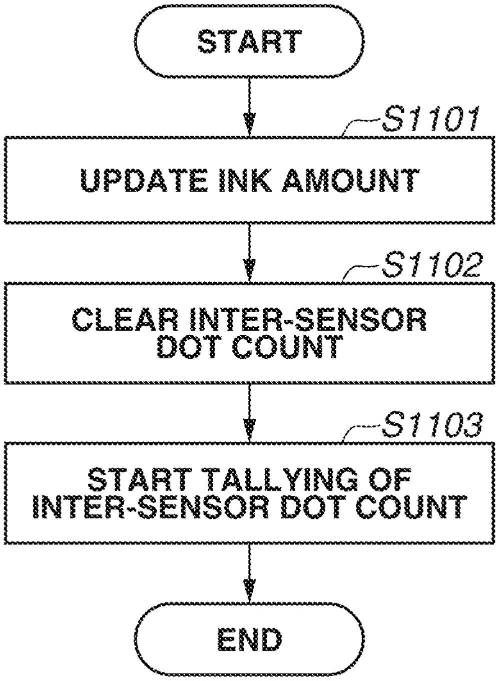
FIG. 11 is a flowchart of a process executed when an ink detection sensor detects the absence of ink.

FIG. 11 is a flowchart of a series of process steps executed when the ink detection sensor 409 detects the absence of ink in the recording apparatus 100 of the present exemplary embodiment. The process in FIG. 11 is implemented by the CPU 101 illustrated in FIG. 1 reading a program from the ROM 102 into the RAM 103 and executing the same, for example.

In step S1101, the remaining ink amount displayed on the display unit 106 of the recording apparatus 100 is updated. At the start of this process, the amount of ink stored in the ink tank unit 110 is slightly below the ink amount 501. Therefore, the process starts at the timing when the ink detection sensor 409 switches from a state of detecting the presence of ink, that is, a state of detecting that the ink amount is equal to or greater than the ink amount 501, to a state of detecting the absence of ink, that is, a state of detecting that the ink amount is less than the ink amount 501. At this time, since the ink detection sensor 409 detects the absence of ink, the ink amount indication is displayed as the remaining amount 606. In step S1102, the information related to the ink dot count in the non-volatile information is cleared. Specifically, 0 is written to the inter-sensor dot count (total) 704, the inter-sensor dot count (printing) 705, and the inter-sensor dot count (recovery) 706.

In step S1102, in order to start the measurement process of the inter-sensor dot count, the dot count tally flag 703 in the non-volatile information is changed to indicate that dot count tally is required.

Figure 12:
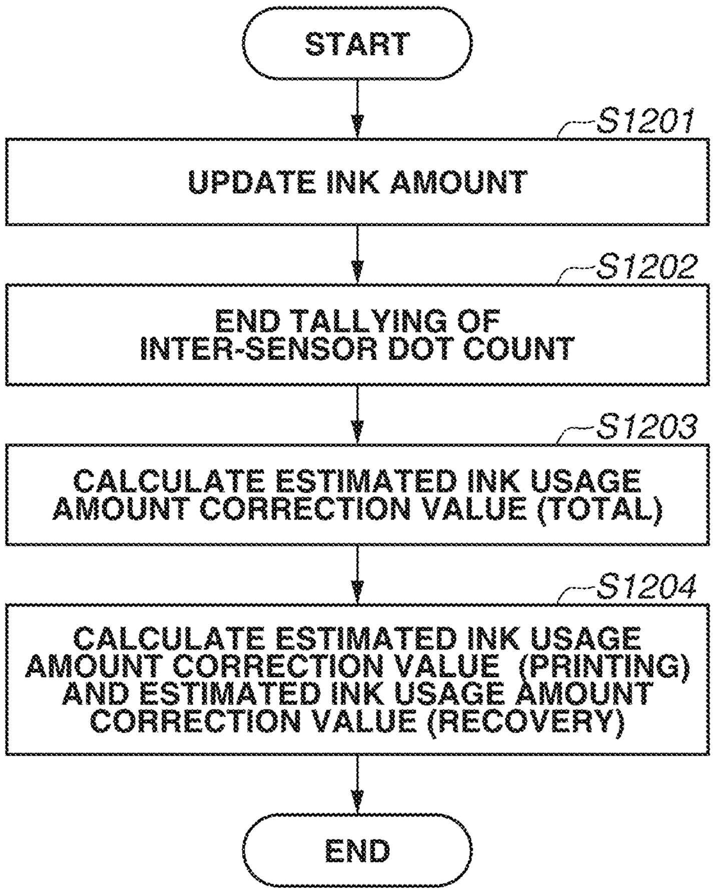
FIG. 12 is a flowchart of a process executed when an ink detection sensor detects the absence of ink.

FIG. 12 is a flowchart of a series of process steps executed when the ink detection sensor 410 detects the absence of ink. The process in FIG. 12 is executed by the CPU 101 illustrated in FIG. 1 reading a program from the ROM 102 into the RAM 103, for example.

In step S1201, the ink amount displayed on the display unit 106 of the recording apparatus 100 is updated. At the start of this process, the amount of ink stored in the ink tank unit 110 is slightly below the ink amount 502. Therefore, the process starts at the timing when the ink detection sensor 410 switches from a state of detecting the presence of ink, that is, a state of detecting that the amount of ink is equal to or greater than the ink amount 502, to a state of detecting the absence of ink, that is, a state of detecting that the amount of ink is less than the ink amount 502.

Because the ink detection sensor 410 detects the absence of ink, the ink amount indication is displayed as the remaining amount 608. In step S1202, in order to end the measurement process of the inter-sensor dot count, the dot count tally flag 703 in the non-volatile information is changed to indicate that dot count tally is not required.

In step S1203, an estimated ink usage amount correction value (total) is calculated based on the tallied inter-sensor dot count (total) 704. Details of the calculation process of the estimated ink usage amount correction value (total) will be described below with reference to FIG. 13. In step S1204, the estimated ink usage amount correction value (printing) and the estimated ink usage amount correction value (recovery) are calculated based on the tallied inter-sensor dot count (printing) 705 and inter-sensor dot count (recovery) 706. Details of the calculation process of the estimated ink usage amount correction value (printing) and the estimated ink usage amount correction value (recovery) will be described below with reference to FIG. 14.

Figure 13:
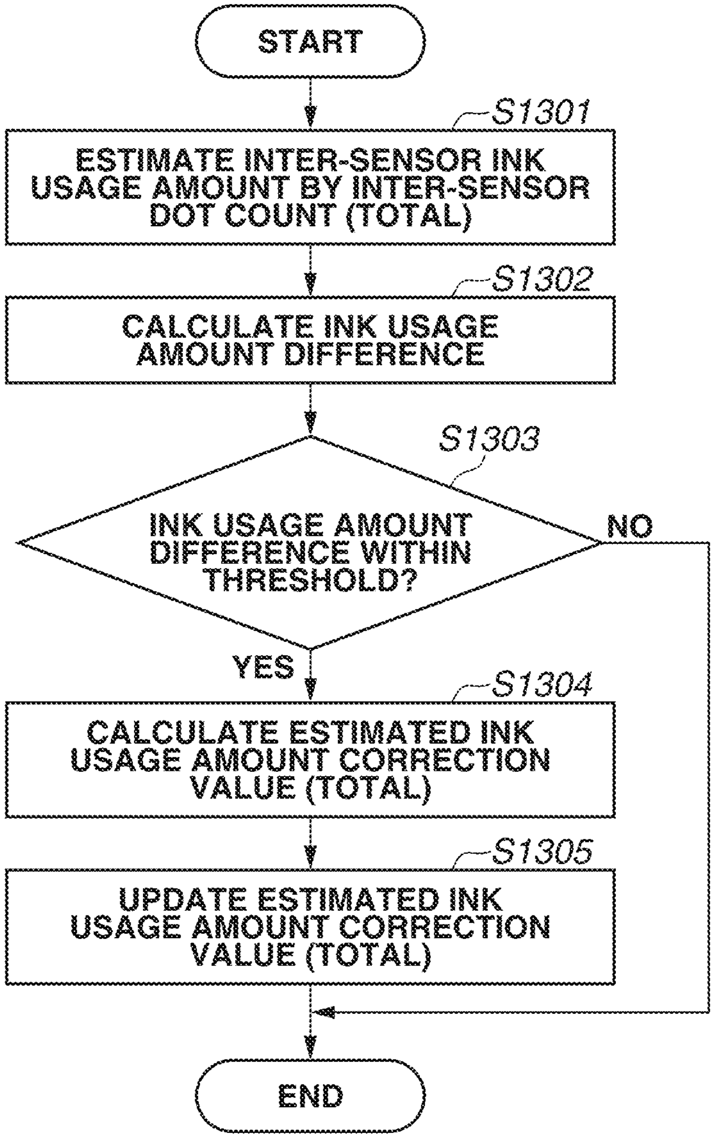
FIG. 13 is a flowchart of a process for creating an estimated ink usage amount correction value (total).

FIG. 13 is a flowchart of a series of process steps for calculating the estimated ink usage amount correction value (total). The process in FIG. 13 is implemented by the CPU 101 illustrated in FIG. 1 reading a program from the ROM 102 into the RAM 103, for example.

In step S1301, the inter-sensor ink usage amount is estimated based on the tallied inter-sensor dot count (total) value. The estimated inter-sensor ink usage amount is calculated based on the dot count value and the mass per dot of ink, as in step S804 in FIG. 8.

In step S1302, the estimated inter-sensor ink usage amount calculated in step S1301 is compared with the inter-sensor ink amount 503 to calculate the difference (ink usage amount difference) between the estimated ink usage amount and the inter-sensor ink amount 503. For example, if the inter-sensor ink amount 503 is 100 ml and the estimated inter-sensor ink usage amount is 110 ml, the ink usage amount difference is 10 ml.

In step S1303, it is determined whether the ink usage amount difference calculated in step S1302 exceeds a predetermined difference threshold value. The difference threshold value is determined for each ink color depending on the ink components, the recording head design, and the like. If the ink usage amount difference calculated in step S1302 is within the difference threshold value (YES in step S1303), the process proceeds to step S1304. If the ink usage amount difference is not within the difference threshold value (NO in step S1303), it is determined that an event has occurred during the processing, such as ink being injected into the ink tank unit 110 or the recording head 401 being replaced, and the process ends without calculating the estimated ink usage amount correction value (total).

In step S1304, the estimated ink usage amount correction value (total) is calculated to correct the ink usage amount difference calculated in step S1302. For example, if the inter-sensor ink amount 503 is 100 ml and the estimated inter-sensor ink usage amount is 110 ml, the estimated ink usage amount correction value (total) is calculated as 100/110=0.909.

In step S1305, the estimated ink usage amount correction value (total) calculated in step S1304 is saved in the estimated ink usage amount correction value (total) 707 of the non-volatile information 701.

Figure 14:
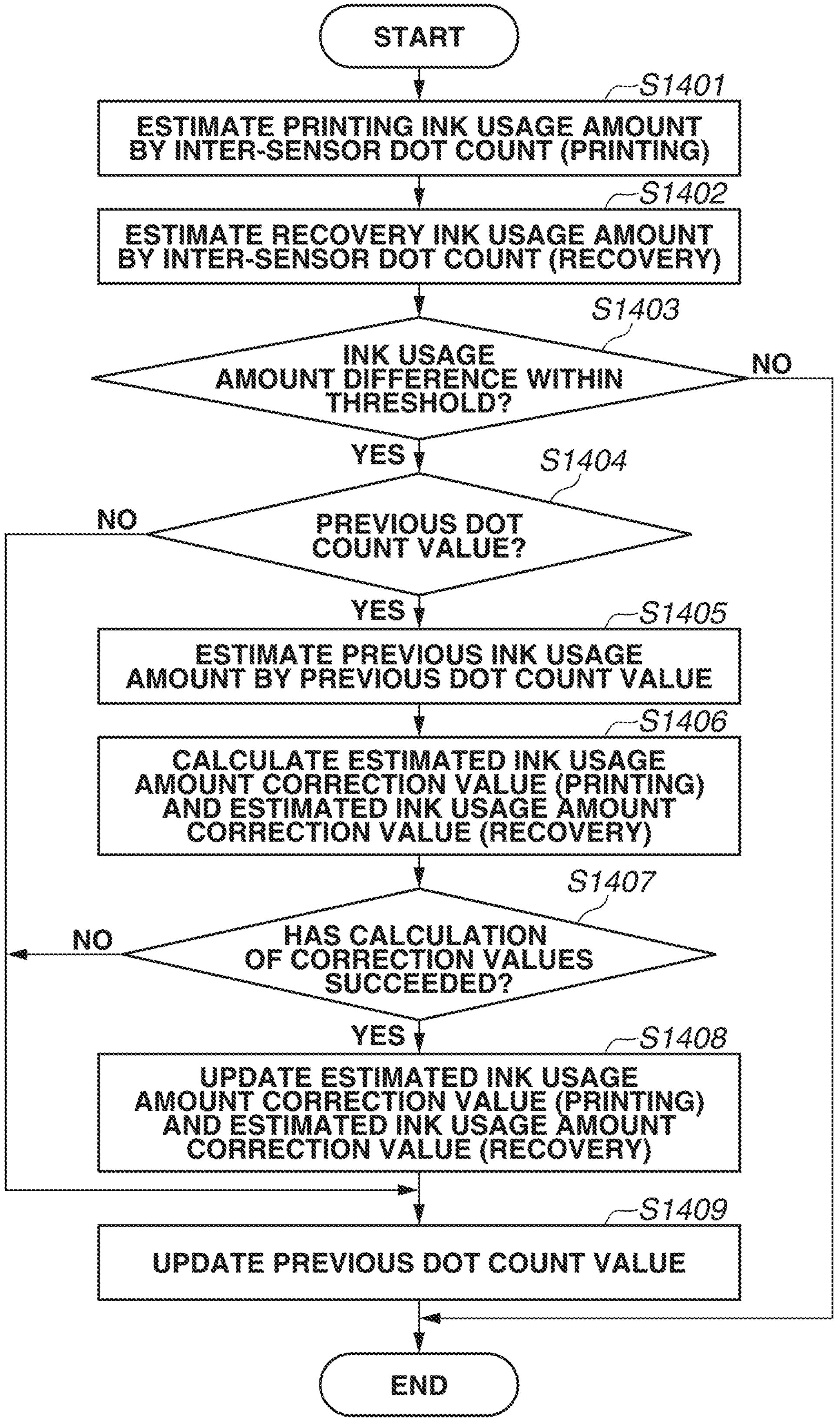
FIG. 14 is a flowchart of a series of process steps for generating an estimated ink usage amount correction value (printing) and an estimated ink usage amount correction value (recovery).

FIG. 14 is a flowchart of a series of process steps for calculating the estimated ink usage amount correction value (printing) and the estimated ink usage amount correction value (recovery). The process in FIG. 14 is implemented by the CPU 101 illustrated in FIG. 1 reading a program from the ROM 102 into the RAM 103 and executing the same, for example. This process is performed during the processing (FIG. 12) when the ink detection sensor 410 detects the absence of ink in each ink tank.

In step S1401, the estimated ink usage amount between the sensors in the printing process is estimated using the inter-sensor dot count (printing) 705 that is saved in the non-volatile information 701. The estimated ink usage amount is calculated based on the dot count value and the mass per dot of ink, as in step S804 in FIG. 8.

In step S1402, the estimated ink usage amount between the sensors in the recovery process is estimated, using the inter-sensor dot count (recovery) 706 that is saved in the non-volatile information 701. The estimated ink usage amount is calculated based on the dot count value and the mass per dot of ink, as in step S804 in FIG. 8.

In step S1403, it is determined whether the difference between the total estimated inter-sensor ink usage amount in the printing process and recovery process, which are calculated in steps S1401 and S1402, and the inter-sensor ink amount 503 (ink usage amount difference) does not exceed a difference threshold value, as in step S1303.

If the ink usage amount difference is within the difference threshold value (YES in step S1403), the process proceeds to step S1404. If the ink usage amount difference is not within the difference threshold value (NO in step S1403), it is determined that ink has been injected into the ink tank unit 110 or the recording head 401 has been replaced during the processing, and the process ends without proceeding to step S1404.

In step S1404, it is confirmed whether dot count information is saved in the previous inter-sensor dot count (printing) 710 and the previous inter-sensor dot count (recovery) 711 in the non-volatile information 701. If the dot count information is saved (YES in step S1404), the process proceeds to step S1405, and if the dot count information is not saved (NO in step S1404), the process proceeds to step S1409.

In step S1405, the previous estimated ink usage amount (printing) and the previous estimated ink usage amount (recovery) are calculated using the previous inter-sensor dot count (printing) 710 and the previous inter-sensor dot count (recovery) 711 saved in the non-volatile information 701. The estimated ink usage amounts are calculated based on the dot count value and the mass per dot of ink, as in step S804 in FIG. 8.

In step S1406, the estimated ink usage amount (current) calculated in step S1402 and the estimated ink usage amount (previous) calculated in step S1405 are used to generate the estimated ink usage amount correction value (printing) 708 and the estimated ink usage amount correction value (recovery) 709. The estimated ink usage amount correction values are generated by solving simultaneous equations using the estimated ink usage amount (current), the estimated ink usage amount (previous), and the inter-sensor ink amount. For example, if the current estimated ink usage amount (printing) is 88.9 ml, the current estimated ink usage amount (recovery) is 25.0 ml, the previous estimated ink usage amount (printing) is 66.7 ml, the previous estimated ink usage amount (recovery) is 50.0 ml, and the inter-sensor ink amount 503 is 100 ml, the following simultaneous equations are solved:

$$88.9x+25.0y=100$$

$$66.7x+50.0y=100.$$

This generates the estimated ink usage amount correction value (printing): x and the estimated ink usage amount correction value (recovery): y. In this example, the estimated ink usage amount correction values x=0.899, y=0.799 are generated.

In step S1407, it is determined whether the calculation of the correction values in step S1406 has succeeded. For example, if a correction value is calculated as a negative number, or if a correction value larger than a predetermined threshold value is calculated, it is determined that the calculation of the correction values has failed (NO in step S1407). If ink is injected into the ink tank unit 110 during the dot count measurement process, or if the recording head 401 is replaced during the dot count measurement process, the tendency of variation in the calculation of the estimated ink usage amounts change during the processing. Accordingly, a proper correction value calculation may not be possible. If the correction values have been calculated in step S1406 (YES in step S1407), the process proceeds to step S1408, and if the correction values have been not calculated (NO in step S1407), the process proceeds to step S1409.

In step S1408, the estimated ink usage amount correction value (printing) 708 and the estimated ink usage amount correction value (recovery) 709 of the non-volatile information 701 are updated by the values calculated in step S1406.

In step S1409, the previous inter-sensor dot count (printing) 710 and the previous inter-sensor dot count (recovery) 711 are updated based on the values of the inter-sensor dot count (printing) 705 and inter-sensor dot count (recovery) 706. The saved dot count values are used in the next correction value calculation. In the present exemplary embodiment, there are two types of ink-used processes, printing and recovery, and correction values are calculated for these processes. If there are three or more types of ink-used processes, correction values corresponding to these processes may be calculated. In this case, the dot count values are saved and calculated a number of times according to the number of types of ink-used processes.

Figure 15:
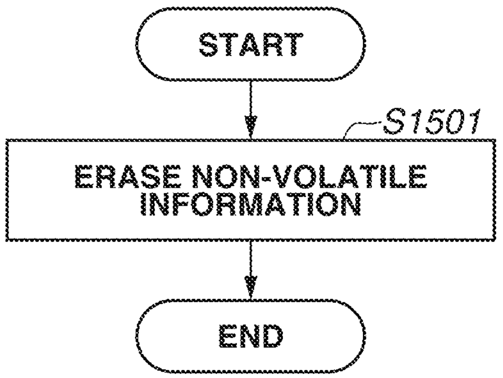
FIG. 15 is a flowchart of a process for clearing the non-volatile information.

FIG. 15 is a flowchart of a series of process steps for clearing non-volatile information 701 in the recording apparatus 100. The process in FIG. 15 is implemented by the CPU 101 illustrated in FIG. 1 reading a program from the ROM 102 into the RAM 103 and executing the same, for example. This process is performed when the recording head 401 is replaced. In the present exemplary embodiment, the recording head 401 is detachably mounted on the carriage 402, and the user can replace the recording head 401 at any time. The recording head 401 is provided with a chip (not illustrated) that stores usage information of the recording head 401. A reading unit (not illustrated) provided on the carriage 402 reads information from the chip of the recording head 401 to detect that the recording head 401 has been replaced.

In step S1501, the information that needs resetting at the time of replacement of the recording head 401 is erased from the non-volatile information 701. In the present exemplary embodiment, information to be erased is information on the dot count tally flag 703, the inter-sensor dot count (total) 704, the inter-sensor dot count (printing) 705, the inter-sensor dot count (recovery) 706, the estimated ink usage amount correction value (total) 707, the estimated ink usage amount correction value (printing) 708, the estimated ink usage amount correction value (recovery) 709, the previous inter-sensor dot count (printing) 710, and the previous inter-sensor dot count (recovery) 711, for all ink colors.

The above-described configuration makes it possible to calculate the difference between the inter-sensor ink amount 503 between the ink detection sensors 409 and 410 and the ink usage amount estimated by dot counting, and correct the estimated ink usage amount. Accordingly, even if there are variations in the amount of ink discharged from the recording head, it is possible to correct for the variations and improve the accuracy of detecting the amount of a liquid in the liquid storage unit.

According to the present disclosure, it is possible to improve the accuracy of detecting the amount of a liquid in the liquid storage unit.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-173262, filed Oct. 4, 2023, which is hereby incorporated by reference herein in its entirety.

What is claimed is:

1. A liquid discharge apparatus comprising:

a liquid discharge head configured to discharge a liquid;

a liquid storage unit configured to store the liquid to be supplied to the liquid discharge head;

a first detection unit configured to detect whether an amount of the liquid stored in the liquid storage unit is equal to or greater than a first amount or is less than the first amount;

a second detection unit configured to detect whether the amount of the liquid stored in the liquid storage unit is equal to or greater than a second amount or is less than the second amount, the second amount being smaller than the first amount; and an estimation unit configured to estimate, as an estimated usage amount, an amount of the liquid discharged by the recording head during a period between a time when the first detection unit detects that the amount of the liquid stored in the liquid storage unit has changed from a state of being equal to or greater than the first amount to a state of being less than the first amount and a time when the second detection unit detects that the amount of the liquid stored in the liquid storage unit has changed from a state of being equal to or greater than the second amount to a state of being less than the second amount, wherein the estimation unit calculates a first correction value for correcting the estimated usage amount based on a first difference that is a difference between the first amount and the second amount, the estimated usage amount, and a second difference that is a difference between the first difference and the estimated usage amount, and then corrects the estimated usage amount based on the first correction value, and wherein in a case where the second difference is greater than a threshold value, the estimation unit does not calculate the first correction value.

2. The liquid discharge apparatus according to claim 1, further comprising a recovery unit configured to recover discharge performance of the liquid discharge head, wherein the liquid discharge head performs a printing process of discharging the liquid onto a recording medium, and a recovery process of discharging the liquid onto the recovery unit, and wherein the estimation unit estimates a first liquid amount that is an amount of the liquid discharged by the recording head in the printing process, and a second liquid amount that is an amount of the liquid discharged by the recording head in the recovery process, and calculates a second correction value for correcting the first liquid amount and a third correction value for correcting the second liquid amount based on the estimated liquid amounts and the first difference.

3. The liquid discharge apparatus according to claim 1, wherein the liquid discharge head is capable of discharging a first liquid and a second liquid different in color from the first liquid, wherein the liquid discharge apparatus further comprises, as the liquid storage unit, a first liquid storage unit configured to store the first liquid and a second liquid storage unit configured to store the second liquid, and wherein the estimation unit calculates a correction value for correcting the estimated usage amount of the first liquid, and a correction value for correcting the estimated usage amount of the second liquid.

4. The liquid discharge apparatus according to claim 1, wherein the liquid storage unit includes an injection port for injecting the liquid into the liquid storage unit.

5. The liquid discharge apparatus according to claim 1, wherein the liquid discharge head is detachable from the liquid discharge apparatus, and erases the first correction value in a case where the liquid discharge head is replaced.

* * * * *